United States Patent Office 2,750,261
Patented June 12, 1956

2,750,261

PRODUCTION OF HYDROGEN

Vladimir N. Ipatieff, Chicago, Ill., and George S. Monroe, deceased, late of Berwyn, Ill., by Noah J. Abram, administrator, Berwyn, Ill., assignors to Universal Oil Products Company, Chicago, Ill., a corporation of Delaware No Drawing. Application November 21, 1951, Serial No. 257,638

5 Claims. (Cl. 23—212)

This application is a continuation-in-part of my copending application Serial Number 758,986, filed July 3, 1947, now abandoned.

This invention relates to the production of hydrogen by the interaction of an aliphatic hydrocarbon and steam at elevated temperatures in the presence of an improved catalytic material.

An object of this invention is to produce high yields of hydrogen by reacting methane and steam.

Another object of this invention is to produce hydrogen with a relatively low content of carbon monoxide.

One specific embodiment of this invention relates to a process for producing hydrogen which comprises reacting an aliphatic hydrocarbon and steam at a reacting temperature below 700° C., and in contact with a catalyst comprising essentially a major proportion by weight of a compound selected from a member of the group consisting of nickel and cobalt, a minor proportion by weight of silica, and a still smaller, but substantial proportion by weight of copper.

Another embodiment of this invention relates to a process for producing hydrogen which comprises reacting a gaseous paraffin and steam at a reacting temperature below 700° C., and in contact with a catalyst comprising a major proportion by weight of a compound selected from the group consisting of nickel and cobalt, a minor proportion by weight of silica, and a still smaller, but substantial proportion by weight of copper.

A further embodiment of this invention relates to a process for producing hydrogen which comprises reacting methane and steam at a reacting temperature below 700° C., and in contact with a catalyst comprising a major proportion by weight of nickel, a minor proportion by weight of silica, and a still smaller, but substantial proportion by weight of copper.

A still further embodiment of this invention relates to a process for producing hydrogen which comprises reacting methane and steam at a temperature of from about 450° to about 700° C., in contact with a catalyst comprising a major proportion by weight of nickel, a minor proportion by weight of silica, and a still smaller, but substantial proportion by weight of copper.

A still further embodiment of this invention relates to a process for producing hydrogen which comprises reacting methane and steam at a temperature of from about 450° to about 700° C., in contact with a catalyst formed by subjecting to reduction an oxide composite comprising from about 5 to about 10% by weight of cupric oxide, from about 60 to about 75% by weight of nickel oxide, and from about 20 to about 30% by weight of silica.

A still further embodiment of this invention relates to a process for producing hydrogen which comprises reacting methane and steam at a temperature of from about 450° to about 700° C., in contact with a catalyst formed by subjecting to reduction an oxide composite comprising from about 5 to about 10% by weight of cupric oxide, from about 67 to about 72% by weight of nickel oxide, and about 23% by weight of silica.

Heretofore hydrogen has been produced by interacting methane and steam in a two-stage process. The first stage of this process was operated with a moderate excess of steam to methane at a temperature of 760° C. or more in heated reactors in order to produce a water-gas containing a substantial amount of carbon monoxide as indicated by the following equation:

$$CH_4 + H_2O \rightarrow 3H_2 + CO$$

The second stage of the process was operated at a much lower temperature to produce the water-gas shift reaction by which carbon monoxide and water are reacted to form carbon dioxide and hydrogen as illustrated by the following equation:

$$CO + H_2O \rightarrow CO_2 + H_2$$

It has also been proposed to effect hydrogen production in a single stage process in heated reactors at a temperature below 700° C., by using molar ratios of steam to hydrogen of about 10 in the presence of a metallic nickel and thereby obtaining a product containing about 2 mol per cent of carbon monoxide. It has also been proposed to effect hydrogen production at substantially atmospheric pressure, probably because the reactions take place with an increase in volume and the equilibrium of each of these reactions is more favorable at lower pressure. Some of these conversions of methane and ethane into hydrogen and carbon oxides may be illustrated by the following equations:

$$CH_4 + 2H_2O \rightarrow 4H_2 + CO_2$$
$$C_2H_6 + 2H_2O \rightarrow 5H_2 + 2CO$$
$$C_2H_6 + 4H_2O \rightarrow 7H_2 + 2CO_2$$

The above indicated reactions of paraffinic hydrocarbons with water have been carried out generally in the presence of metal catalysts such as those containing a member of the group consisting of iron, cobalt, nickel, chromium, manganese, copper, molybdenum, vanadium, and tungsten. Of these different metal catalysts, those containing nickel and cobalt have been used more generally.

We have found that improved catalysts of high activity for producing hydrogen by the interaction of water and aliphatic hydrocarbons, particularly gaseous paraffinic and/or olefinic hydrocarbons, are formed by compositing nickel, copper, and silica in a particular manner. Our nickel-copper-silica catalysts are produced preferably by co-precipitating a mixture of nickel carbonate and copper carbonate upon diatomaceous earth, washing and drying the resultant precipitated material, then heating this metal to drive off carbon dioxide, thereby forming a mixture of nickel oxide, copper oxide, and diatomaceous earth which is essentially silicon dioxide, and then reducing the oxide mixture to form an active catalyst comprising essentially nickel, copper, and diatomaceous earth admixed with relatively small amounts of nickel oxide and copper oxide. The preferred catalysts of the present invention may also be prepared by mixing the nitrates of the desired metals, such as nickel nitrate and copper nitrate and adding to the solution a suitable amount of diatomaceous earth, followed by evaporation of the water present, and decomposition of the resultant mass, thereby eliminating the oxides of nitrogen present, and reducing this mixture to form an active catalyst comprising the desired metals and oxides of the metals. It is to be emphasized that this invention is not to be restricted by any particular manner of preparation for the invention resides in the catalyst compositions which have been discovered and which will be hereinafter set forth more fully.

The catalysts preferred for this process are those prepared by reducing mixtures of copper oxide, nickel oxide, and silica and containing from about 5 to 10% by weight of copper oxide, 23% by weight of silica and the remainder of nickel oxide. The copper oxide in such a mixture is thus from about 6.5 to 13% by weight of the total of nickel oxide and copper oxide. In some cases, it may also be advisable to vary the silica content from 20 to 30%, while the copper oxide content is varied from 5 to 10% thus causing the nickel oxide content to fall between 60 and 75%. Such nickel-copper-silica catalysts have high activity and long life in the process for producing hydrogen by the interaction of methane and steam at temperatures of from about 450° to about 700° C. These composite catalysts are more active along with the desired longer life, than catalysts prepared similarly from a nickel salt and diatomaceous earth, that is, a nickel-diatomaceous earth catalyst such as is frequently employed for the hydrogenation of olefinic hydrocarbons. This high activity of our preferred nickel-copper-silica catalyst is unexpected in view of the findings of Fischer and Tropsch, Brennstoff Chemie 9, 39–46 (1928), that either nickel or cobalt on silica were good catalysts for hydrogen production from methane and other hydrocarbon gases, but that iron, copper, molybdenum, and tungsten on silica were poor catalysts. Since copper deposited on silica is a poor catalyst for hydrogen production, according to Fischer and Tropsch, it is surprising that a composite of copper, nickel, and silica is superior in hydrogen-producing activity to nickel-silica or cobalt-silica themselves, and it is furthermore surprising that the catalyst composite of the present invention has high activity and long life.

Catalysts suitable for promoting the conversion of mixtures of steam and aliphatic hydrocarbons including gaseous and liquid paraffins and olefins into hydrogen according to our process, contain a major proportion by weight of nickel, a minor proportion by weight of silica (preferably in the form of diatomaceous earth), and a smaller, but significant proportion of copper. Similarly useful catalysts are produced by compositing cobalt, silica, and copper in proportions similar to those used for the mentioned catalysts containing nickel, copper, and silica. Successful and long life catalysts for the process of the present invention have been prepared in the following manner: Hot aqueous solutions containing the required amounts of nickel and copper sulfates or nitrates are added to a suspension of diatomaceous earth and water and the resultant mixture is then heated at a temperature of from about 60° to about 80° C. with stirring while a hot aqueous solution of sodium carbonate is added thereto with stirring to precipitate nickel carbonate and copper carbonate upon the diatomaceous earth. This precipitation is usually carried out at a temperature of from about 60° to about 80° C., and can very successfully be carried out at 70° C., and it has been found desirable to add about 1.7 molar proportions of sodium carbonate per atomic proportion of total nickel and copper ions in order that the finished catalyst will have the desired high activity and long life for the hydrogen production reaction.

The mixture of nickel carbonate, copper carbonate, and diatomaceous earth may then be separated from the aqueous solution by filtration, the solid material dried, mixed with about 4% by weight of finely divided graphite to act as a pelleting lubricant and then the mixed powder formed into pellets by a pilling machine. The pelleted material may then be heated in air at temperatures of about 340° C. or thereabout to decompose the nickel carbonate and copper carbonate into the oxides. After the evolution of carbon dioxide has substantially ceased, the resultant mixture of nickel oxide, copper oxide, and silicon dioxide is then heated in a stream of hydrogen at a temperature which is increased gradually up to about 540° C., or thereabout in order to effect substantial reduction to metallic nickel and copper so as to form a catalytic material of high activity and long life for the hydrogen production reaction. Catalysts which are so prepared retain their activity for hydrogen production for a relatively long time. Catalysts containing cobalt and copper deposited upon diatomaceous earth may be formed similarly by employing an aqueous solution of cobalt nitrate or cobalt sulfate instead of nickel nitrate or nickel sulfate in the aforementioned procedure.

This process for producing hydrogen by reacting an aliphatic hydrocarbon, preferably methane, with steam in the presence of a catalyst formed by reducing a composite of from about 5 to about 10% by weight of cupric oxide, from about 60 to about 75% by weight of nickel oxide, and from about 20 to about 30% by weight of silica, is carried out preferentially as a continuous operation. In this treatment methane and steam are preheated to the reaction temperature of from about 450° to about 700° C., commingled and then contacted with the catalyst of the type hereinbefore set forth to effect the production of a gas mixture comprising essentially hydrogen and carbon dioxide admixed with some unconverted methane, and a minor amount of carbon monoxide. In this treatment from about 2 to about 20 or more molecular proportions of steam are employed per molecular proportion of methane. It is generally preferred to charge from 5 to 15 molecular proportions of steam per molecular proportion of methane in order to obtain a gaseous product containing a relatively high proportion of hydrogen and a relatively low proportion of carbon monoxide. Carbon dioxide which is also formed may be separated from the hydrogen by suitable means such as by compression and washing with water whereby the carbon dioxide is absorbed preferentially.

As the hydrogen-producing reaction is highly endothermic, it is necessary to supply heat to the reactor as by external heating or by the use of heat exchangers, and the like. While the process is preferably carried out with substantially atmospheric pressure, it may also be effected at a super-atmospheric pressure preferably in the presence of a relatively high molecular proportion of steam per molecular proportion of methane or other hydrocarbon charging stock.

For this process, we have found that silica is preferred to alumina or magnesia as a catalyst ingredient. In the presence of the catalyst containing a major portion of nickel, a minor portion of silica, and a still smaller portion of copper, higher yields of hydrogen were obtained than in the presence of similar catalysts containing alumina or magnesia instead of silica or diatomaceous earth. The active life of the silica-containing catalyst was also longer than the life of other catalysts containing either alumnia or magnesia.

The following examples are given to illustrate the character of the results obtained by the use of the specific embodiment of this invention, although the data presented are not introduced with the intention of restricting unduly the generally broad scope of the invention.

EXAMPLE I

A catalyst with high activity in this process was prepared by suspending 231 parts by weight of diatomaceous earth in a dilute aqueous solution containing 286 parts by weight of cupric nitrate hexahydrate and 2700 parts by weight of nickelous nitrate hexahydrate. The mixture of copper nitrate and nickel nitrate solution and diatomaceous earth was heated to 70° C., and was stirred vigorously while a hot saturated solution of sodium carbonate in water was added thereto to precipitate nickel carbonate and copper carbonate upon the diatomaceous earth. This precipitation was carried out at about 70° C., and the sodium carbonate solution was added until about 1.7 molecular proportions of sodium carbonate were added per molecular proportion of total metal ions (nickel + copper) in the precipitation reaction mixture. The resultant precipitation mixture was then filtered to remove the aqueous solution from the composite of nickel carbonate, copper carbonate, and diatomaceous earth. The composite was then dried and heated to decompose the metal carbonates and the solid material was then mixed with about 4% by weight of finely divided graphite as a pelleting lubricant and the mixed powder was then formed into pellets by a pilling machine. The pellets were then heated in a stream of hydrogen at a temperature which was increased gradually to about 538° C. in order to reduce a substantial proportion of the metal oxides so as to form a nickel-copper-silica catalyst with high activity and long life for the hydrogen production reaction.

The composite of metal oxides and silica prepared as indicated above contained on analysis about 7.7% by weight of cupric oxide, 69.2% by weight of nickel oxide, and 23.1% by weight of silicon dioxide. The catalytic material formed by reducing this oxide mixture had an unexpectedly high activity and long life for the hydrogen-producing reaction of this process. A similar copper-nickel-silica catalyst was formed by essentially the same procedure but by proportioning the amounts of cupric nitrate and nickelous nitrate so that the resultant oxide mixture, before reduction, contained 15.2% by weight of cupric oxide, 61.7% by weight of nickel oxide, and 23.1% by weight of silicon dioxide. As will be hereinafter set forth, although this catalyst had an initial high activity, it had a short life as compared with the preferred catalyst composition of the present invention. Also a nickel-silica catalyst was formed by essentially the same procedure so that the oxide mixture before reduction contained 76.9% by weight of nickel oxide and 23.1% by weight of silicon dioxide.

The reduced metal-silica catalysts formed as hereinbefore set forth were employed in the form of a catalyst layer in a steel reactor through which proportioned mixtures of methane and water were passed while the reactor and catalyst were maintained at a temperature of from about 450° to about 700° C. Some of these runs in which methane and steam were reacted to produce hydrogen and carbon oxides (mainly carbon dioxide) were carried out at atmospheric pressure while others were carried out at a gage pressure of 250 pounds per square inch. Some of the results obtained at atmospheric pressure in the presence of these catalysts are given in Table I. These catalyst activity tests were made at progressively increased temperature levels on the same preparation of catalysts. By this procedure, one to three experiments usually showed whether the catalyst had good or poor activity.

In this example and in the following examples, two sets of experimentally determined data are presented. The composition of the exit gases was determined by one experimental measurement and the hydrogen yield and methane conversion were determined by another experimental measurement, thus making these latter two values interdependent. The hydrogen yields were determined from expansion data. The hydrogen yield (mols hydrogen produced per 100 mols methane charged) equals the percent expansion:

$$\frac{\Delta \text{ volume}}{\text{volume CH}_4} \times 100$$

The methane conversion was calculated by the formula:

Percent methane converted =

$$\text{Percent expansion} / \left(3 + \frac{\text{Percent CO}_2}{\text{Percent CO} + \text{Percent CO}_2}\right)$$

The composition of the gaseous product was determined by combustion and absorption methods. The exact method utilized was UOP Method No. G-84-40, "Gas Analysis by the Göckel Apparatus" described in UOP Laboratory Test Methods for Petroleum and Its Products, published by Universal Oil Products Company, 310 South Michigan Avenue, Chicago, Illinois (1940). The Göckel apparatus makes possible the analysis of gases varying widely in composition. The Göckel apparatus is a modification of the Orsat apparatus for absorption analysis of gases, with the addition of combustion units for the determination of hydrogen and paraffins. It is limited to hydrocarbon gases with not more than 4 carbon atoms in the molecule together with the common fixed gases.

Table I.—*Conversion of methane and steam into hydrogen and carbon oxides over various catalysts. Effect of catalyst compositions on activity at atmospheric pressure*

7.7% CuO + 69.2% NiO + 23.1% DIATOMACEOUS EARTH [b]

| Temperature, °C. | | Hrs. | H.G.S.V.[a] $CH_4$ | Mole Ratio, $H_2O/CH_4$ | $CH_4$ Conv., Percent | $H_2$ Yield Moles $H_2$/100 Moles $CH_4$ | Composition of Exit Gas | | | |
|---|---|---|---|---|---|---|---|---|---|---|
| Furnace Block | Catalyst | | | | | | $CO_2$ | CO | $H_2$ | $CH_4+N_2$ |
| 501 | 481 | 2.5 | 112 | 5.7 | 55.0 | 215.0 | 13.0 | 1.2 | 77.2 | 13.6 |
| 552 | 533 | 2.5 | 112 | 5.4 | 73.0 | 281.0 | 15.0 | 2.6 | 75.8 | 6.6 |
| 575 | 555 | 2.5 | 117 | 5.1 | 80.4 | 307.0 | 14.2 | 3.2 | 77.8 | 4.8 |
| 600 | 576 | 2.5 | 123 | 5.1 | 82.3 | 317.0 | 14.0 | 2.4 | 80.0 | 3.6 |
| 650 | 629 | 7.0 | 122 | 5.0 | 92.9 | 340.0 | 12.4 | 6.4 | 78.6 | 2.6 |

15.4%+ CuO + 61.5% NiO + 23.1% DIATOMACEOUS EARTH

| 502 | 482 | | 120 | 5.1 | 47.0 | 186.0 | 17.1 | 1.0 | 66.2 | 15.7 |
|---|---|---|---|---|---|---|---|---|---|---|
| 550 | 529 | | 117 | 5.1 | 67.8 | 261.0 | 16.0 | 2.8 | 72.7 | 8.5 |
| 601 | 582 | | 118 | 5.2 | 88.2 | 333.0 | 14.6 | 4.8 | 77.2 | 3.4 |

76.9% NiO + 23.1% DIATOMACEOUS EARTH

| 505 | 486 | 3.5 | 121 | 5.0 | 54.2 | 210.0 | 15.0 | 2.2 | 67.8 | 15.0 |
|---|---|---|---|---|---|---|---|---|---|---|
| 550 | 525 | 2.5 | 121 | 5.1 | 69.5 | 273.0 | 15.4 | 1.2 | 74.7 | 8.7 |
| 600 | 581 | 3.5 | 122 | 5.2 | 86.7 | 323.0 | 15.0 | 5.8 | 75.8 | 3.4 |
| 650 | 640 | 7.0 | 120 | 5.1 | 91.1 | 337.0 | 13.7 | 5.9 | 78.6 | 1.8 |

[a] Hourly Gas Space Velocity (volume gas (S. T. P.) charged per unit volume catalyst per hour).
[b] Compositions of catalysts are given on unreduced basis.

At atmospheric pressure, hydrogen yields of from 210 to 337 per cent (methane conversion 54-91 per cent) were obtained in the presence of the nickel-diatomaceous earth catalyst at catalyst temperatures of from 486° to 640° C. when the molar ratio of water to methane was 5.1 and the hourly space velocity of the methane was 120. The results obtained with the first copper-nickel-diatomaceous earth catalyst (7.7 per cent CuO) and with the second copper-nickel-diatomaceous earth catalyst (15.4 per cent CuO) also showed high conversions to hydrogen. Increase in the temperature of the catalyst increased the hydrogen yield, the per cent conversion of the methane, and the ratio of carbon monoxide to carbon dioxide in the product gases.

EXAMPLE II

Other catalysts similar to those described in Example I were prepared by starting with nickel sulfate and copper sulfate and using sodium carbonate as the precipitating reagent. The quantities of starting materials used in preparing one of these catalysts are as follows:

| | Weight grams | Composition (Before Reduction) | | Copper-Nickel Ratio |
|---|---|---|---|---|
| | | | Weight percent | |
| $CuSO_4 \cdot 5H_2O$ | 59.2 | CuO | 7.6 | 1:9 |
| $NiSO_4 \cdot 6H_2O$ | 608.0 | NiO | 69.3 | |
| Kieselguhr (Johns-Manville "Filter Cel") | 57.6 | $SiO_2$ | 23.1 | |
| $Na_2CO_3$ | 462.5 | | | |

In carrying out this catalyst preparation, the sodium carbonate solution was made by dissolving 462.5 g. (4.35 moles) anhydrous $Na_2CO_3$ in 2000 ml. warm (40° C.) distilled water. The copper and nickel sulfates (0.24 and 2.31 moles, respectively) were dissolved in 12 liters distilled water in a 5-gallon crock provided with an immersion heater, stirrer, dropping funnel and thermometer. While the temperature of the sulfate solution was being raised, 57.6 g. kieselguhr was added maintaining suspension by agitation. When the temperature of the suspension reached 70° C., the sodium carbonate solution was added dropwise over a period of 1.5 hours, holding the temperature at 70–72° C., throughout the precipitation. Agitation was continued for about 15 minutes at 70° C., after the carbonate solution was added. The agitation was stopped, the immersion heater was removed, and the precipitation mass allowed to cool overnight.

The next day the precipitate was washed by decantation and on a suction filter with distilled water. The washing was continued until no test for sulfate ion was obtained in the filtrate. The filter cake was broken up and dried at 108–115° C., after which time it was ground to 30-mesh and pilled with 4 per cent graphite. The catalyst pills were decomposed in a stream of nitrogen by slowly raising the temperature to 350° C. and holding at this temperature until the evolution of carbon dioxide practically ceased. The catalyst pills were reduced in hydrogen at 538° C.

A similar copper-nickel-silica catalyst was prepared by essentially the same procedure but by proportioning the amounts of copper sulfate and nickel sulfate so that the resultant oxide mixture before reduction contained 15.4 per cent by weight of copper oxide, 61.5 per cent of nickel oxide, and 23.1 per cent of diatomaceous earth. Also a nickel-silica catalyst, a copper-nickel-magnesia, a nickel-alumina, and a copper-nickel-alumina catalyst were formed by essentially the same procedure starting with the chosen metal sulfate and oxide carrier or supporting material.

The catalysts described in this example were also used in a number of runs in which methane and water were contacted with the catalyst at a gage pressure of 250 pounds per square inch. Increase in pressure lowered the hydrogen yield and methane conversion over those obtained at atmospheric pressure but an increase in the mole ratio of water to methane at the higher pressure, counteracted the adverse effect of increased pressure. Results obtained in some of these runs in the presence of the three catalysts referred to in Example I and also in the presence of similar catalysts supported by alumina and magnesia gave results shown in Table II.

*Table II.—Conversion of methane and steam into hydrogen and carbon oxides over various catalysts at a gage pressure of 250 pounds per square inch*

7.7% CuO + 69.2% NiO + 23.1% DIATOMACEOUS EARTH

| Temperature, °C. | | Hrs. | H.G.S.V.[a] $CH_4$ | Mole Ratio, $H_2O/CH_4$ | $CH_4$ Conv., Percent | $H_2$ Yield, Moles $H_2$/100 Moles $CH_4$ | Composition of Exit Gas | | | |
|---|---|---|---|---|---|---|---|---|---|---|
| Furnace Block | Catalyst | | | | | | $CO_2$ | CO | $H_2$ | $CH_4+N_2$ |
| 600 | 571 | 5.0 | 114 | 31.4 | 81.3 | 320.0 | 16.8 | 1.1 | 75.3 | 6.8 |
| 650 | 626 | 5.0 | 115 | 31.1 | 86.6 | 340.0 | 16.5 | 1.4 | 79.8 | 2.3 |
| 700 | 688 | 5.0 | 113 | 31.6 | 92.5 | 361.0 | 16.2 | 1.8 | 80.1 | 1.9 |

15.4% CuO + 61.5% NiO + 23.1% DIATOMACEOUS EARTH

| Furnace Block | Catalyst | Hrs. | H.G.S.V. $CH_4$ | Mole Ratio $H_2O/CH_4$ | $CH_4$ Conv., Percent | $H_2$ Yield | $CO_2$ | CO | $H_2$ | $CH_4+N_2$ |
|---|---|---|---|---|---|---|---|---|---|---|
| 600 | 582 | 5 | 112 | 32.5 | 74.8 | 294.0 | 16.2 | 1.2 | 73.6 | 9.2 |
| 650 | 637 | 5 | 112 | 32.1 | 80.3 | 316.0 | 15.0 | 1.6 | 75.8 | 7.6 |

76.9% NiO + 23.1% DIATOMACEOUS EARTH

| Furnace Block | Catalyst | Hrs. | H.G.S.V. $CH_4$ | Mole Ratio $H_2O/CH_4$ | $CH_4$ Conv., Percent | $H_2$ Yield | $CO_2$ | CO | $H_2$ | $CH_4+N_2$ |
|---|---|---|---|---|---|---|---|---|---|---|
| 500 | 471 | 5.5 | 108 | 30.8 | 51.4 | 206.0 | 15.8 | 0.2 | 69.2 | 14.8 |
| 550 | 517 | 5.5 | 113 | 31.8 | 76.5 | 304.0 | 17.2 | 0.4 | 75.0 | 7.4 |
| 600 | 571 | 4.5 | 116 | 31.2 | 84.0 | 332.0 | 17.0 | 0.8 | 78.2 | 4.0 |
| 650 | 629 | 5.0 | 114 | 31.9 | 88.5 | 351.0 | 17.0 | 0.6 | 77.8 | 4.0 |

7.6% CuO + 69.3% NiO + 23.1% MgO

| Furnace Block | Catalyst | Hrs. | H.G.S.V. $CH_4$ | Mole Ratio $H_2O/CH_4$ | $CH_4$ Conv., Percent | $H_2$ Yield | $CO_2$ | CO | $H_2$ | $CH_4+N_2$ |
|---|---|---|---|---|---|---|---|---|---|---|
| 600 | 578 | 5 | 113 | 32.0 | 56.1 | 220.0 | 14.5 | 0.9 | 68.7 | 15.9 |
| 600 | 586 | 5 | 113 | 32.0 | 6.5 | 26.0 | 2.8 | 0.9 | 20.6 | 76.6 |
| 650 | 641 | 5 | 113 | 32.0 | 2.3 | 8.0 | 0.4 | 0.6 | 5.7 | 93.3 |

79.6% NiO + 23.1% $Al_2O_3$

| Furnace Block | Catalyst | Hrs. | H.G.S.V. $CH_4$ | Mole Ratio $H_2O/CH_4$ | $CH_4$ Conv., Percent | $H_2$ Yield | $CO_2$ | CO | $H_2$ | $CH_4+N_2$ |
|---|---|---|---|---|---|---|---|---|---|---|
| 600 | 585 | 5 | 113 | 32.0 | 3.4 | 12.0 | 0.4 | 0.4 | 7.6 | 91.6 |

7.7% CuO + 69.2% NiO + 23.1% $Al_2O_3$

| Furnace Block | Catalyst | Hrs. | H.G.S.V. $CH_4$ | Mole Ratio $H_2O/CH_4$ | $CH_4$ Conv., Percent | $H_2$ Yield | $CO_2$ | CO | $H_2$ | $CH_4+N_2$ |
|---|---|---|---|---|---|---|---|---|---|---|
| 600 | 588 | 4 | 113 | 32.0 | 3.2 | 13.0 | 0.6 | 0.0 | 10.2 | 89.2 |

[a] Hourly Gas Space Velocity (volume gas (S. T. P.) charged per unit volume of catalyst per hour).

At a gage pressure of 250 pounds per square inch and when using a molar ratio of water to methane of 32:1, the hydrogen yield was 206 to 351 per cent (methane conversion 51–88 per cent) in the presence of the nickel-diatomaceous earth catalyst. Higher yields of hydrogen and high conversions of methane were also effected in the presence of the copper-nickel-diatomaceous earth catalyst prepared from the oxide mixture containing 7.7 per cent by weight of cupric oxide. It is to be noted that this catalyst containing diatomaceous earth had the highest activity.

Data given in Table II also show that magnesia and alumina are inferior to diatomaceous earth (silica) as a carrier for nickel, and nickel-copper catalysts used in the preparation of hydrogen from methane and steam at a pressure of 250 pounds per square inch. In a run carried out in the presence of the copper-nickel-magnesia catalyst referred to in Table II, the hydrogen yield dropped from 220 to 26 per cent in two consecutive runs at a temperature of 600° C. The hydrogen yield obtained in the presence of nickel-alumina catalyst and also in the presence of a copper-nickel-alumina catalyst were 12 and 13 per cent respectively during test runs of four hours at a temperature of 600° C.

EXAMPLE III

Life test runs were also made on the nickel-silica catalysts and on the two copper-nickel-silica catalysts referred to in Example II. A summary of results obtained in these runs at atmospheric pressure and also in runs at a gage pressure of 250 pounds per square inch are given in Table III.

*Table III.—Summary of life tests on hydrogen producing catalysts*

ATM. PRESS. ($H_2O/CH_4=5$; H. G. S. V. $-CH_4=115$)

| Temp., ° C. Furnace Block | 76.9% NiO+23.1%ᵃ Diatomaceous Earth | | 7.7% CuO+69.2% NiO+23.1% Diatomaceous Earth | | 15.4% CuO+61.5% NiO+23.1% Diatomaceous Earth | |
|---|---|---|---|---|---|---|
| | Hrs. | Drop in $H_2$ Yield | Hrs. | Drop in $H_2$ Yield | Hrs. | Drop in $H_2$ Yield |
| 500 | 54 | 216–166 | 78 | 217–194 | No life test made. | |
| 600 | 55 | 324–296 | 65 | 316–314 | | |
| 650 | 28 | 326–328 | 36 | 340–340 | | |

250 P. S. I. G. ($H_2O/CH_4=32$; H. G. S. V. $-CH_4=115$)

| | | | | | | |
|---|---|---|---|---|---|---|
| 600 | 10 | 330–74 | 44 | 340–285 | 40 | 290–140 |
| 650 | 20 | 350–175 | 69 | 350–175 | 40 | 315–180 |
| 700 | | | 40 | 355–300 | | |

ᵃ Compositions of catalysts are given on unreduced basis.

The nickel-diatomaceous earth catalyst and the second copper-nickel-diatomaceous earth catalyst prepared by reducing the oxide mixture containing 15.4 per cent cupric oxide had relatively short lives. The hydrogen yield (based upon the volume of methane charged) at a furnace block temperature of 650° C. and at a pressure of 250 pounds per square inch decreased from 350 to 175 per cent in the course of twenty hours, when using the nickel-diatomaceous earth catalyst. The hydrogen yield decreased from 316 to 258 per cent in thirty hours operation with the second copper-nickel-diatomaceous earth catalyst and from 315 to 180 per cent in 40 hours. The copper-nickel-diatomaceous earth catalyst resulting from reduction of the oxide mixture containing 7.7 per cent copper oxide had a much longer life. At 650° C. furnace block temperature and atmospheric pressure during a test period of 36 hours with this catalyst, the hydrogen yield was constant at 340 per cent. These results with the latter catalyst indicated its superior life over that of the nickel-silica catalyst containing a substantially higher proportion of copper. The results show that a critical concentration of copper is required for catalysts of maximum life under the conditions employed in these runs.

We claim as our invention:

1. A process for producing hydrogen which comprises reacting an aliphatic hydrocarbon and steam at a reaction temperature below 700° C. in contact with a catalyst formed by reducing a composite of from about 5 to about 10% by weight of cupric oxide, from about 60 to 75% by weight of nickel oxide, and from about 20 to about 30% by weight of silica, said catalyst comprising essentially a major proportion of nickel, a minor proportion of silica and a still smaller proportion of copper, the bulk of the nickel and copper being in the metallic state and only small amounts thereof being present as oxides.

2. The process of claim 1 further characterized in that said silica is diatomaceous earth.

3. A process for producing hydrogen which comprises reacting a gaseous paraffin hydrocarbon and steam at a reaction temperature below 700° C. and in contact with a catalyst formed by reducing a composite of from about 5 to about 10 per cent by weight of cupric oxide, from about 60 to about 75 per cent by weight of nickel oxide, and from about 20 to about 30 per cent by weight of silica, said catalyst comprising essentially a major proportion of nickel, a minor proportion of silica and a still smaller proportion of copper, the bulk of the nickel and copper being in the metallic state and only small amounts thereof being present as oxides.

4. A process for producing hydrogen which comprises reacting methane and steam at a temperature of from about 450° to about 700° C. in contact with a catalyst formed by subjecting to reduction an oxide composite comprising from about 5 to about 10 per cent by weight of cupric oxide, from about 60 to about 75 per cent by weight of nickel oxide, and from 20 to about 30 per cent by weight of silica, said catalyst comprising essentially a major proportion of nickel, a minor proportion of silica and a still smaller proportion of copper, the bulk of the nickel and copper being in the metallic state and only small amounts thereof being present as oxides.

5. A process for producing hydrogen which comprises reacting methane and steam at a temperature of from about 450° to about 700° C. in contact with a catalyst formed by subjecting to reduction an oxide composite comprising from about 5 to about 10 per cent by weight of cupric oxide, from about 67 to about 72 per cent by weight of nickel oxide, and about 23 per cent by weight of silica, said catalyst comprising essentially a major proportion of nickel, a minor proportion of silica and a still smaller proportion of copper, the bulk of the nickel and copper being in the metallic state and only small amounts thereof being present as oxides.

(References on following page)

References Cited in the file of this patent

UNITED STATES PATENTS

| | | |
|---|---|---|
| 1,391,666 | Bosch et al. | Sept. 27, 1921 |
| 2,010,427 | Eversole | Aug. 6, 1935 |
| 2,112,643 | Baensch et al. | Mar. 29, 1939 |
| 2,422,671 | Haensel et al. | June 24, 1947 |
| 2,577,563 | Belchetz | Dec. 4, 1951 |

OTHER REFERENCES

Fischer et al.: "Brennstoff Chemie," vol. 9, pages 39–46 (1928), page 15 of photostat of article.